US008773710B2

(12) United States Patent
Tsugimura

(10) Patent No.: US 8,773,710 B2
(45) Date of Patent: Jul. 8, 2014

(54) CONTROLLING DEVICE

(75) Inventor: Koichi Tsugimura, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 97 days.

(21) Appl. No.: 13/188,966

(22) Filed: Jul. 22, 2011

(65) Prior Publication Data

US 2012/0033236 A1 Feb. 9, 2012

(30) Foreign Application Priority Data

Aug. 6, 2010 (JP) ................................. 2010-177562

(51) Int. Cl.
G06K 15/02 (2006.01)
G06F 3/12 (2006.01)
G06K 15/00 (2006.01)

(52) U.S. Cl.
USPC ........... 358/1.2; 358/1.1; 358/1.13; 358/1.14; 358/1.18

(58) Field of Classification Search
None
See application file for complete search history.

(56) References Cited

U.S. PATENT DOCUMENTS

| 7,240,281 B2 * | 7/2007 | Gomi et al. .................... 715/513 |
| 2002/0051172 A1 | 5/2002 | Nomura | |
| 2002/0067500 A1 | 6/2002 | Yokomizo et al. | |
| 2005/0052677 A1 * | 3/2005 | Maruyama .................... 358/1.13 |
| 2006/0056873 A1 | 3/2006 | Kimura | |
| 2006/0209329 A1 * | 9/2006 | Akiyama ...................... 358/1.13 |

FOREIGN PATENT DOCUMENTS

| JP | 10-313399 | 11/1998 |
| JP | 2001-101436 | 4/2001 |
| JP | 2001-175432 A | 6/2001 |
| JP | 2006-85376 | 3/2006 |
| JP | 2007-94950 A | 4/2007 |
| JP | 2009-70296 A | 4/2009 |

OTHER PUBLICATIONS

Notification of Reasons for Rejection dated Sep. 17, 2013 from related Japanese Patent Application No. 2010-177562, together with an English language translation.

* cited by examiner

Primary Examiner — Fred Guillermety
Assistant Examiner — Henok A Shiferaw
(74) Attorney, Agent, or Firm — Scully, Scott, Murphy & Presser, PC

(57) ABSTRACT

A controlling device may be configured to generate a first type of intermediate data using the original data after accepting a print instruction for printing the original image and before accepting a setting instruction for setting a print condition from a user. The controlling device may be configured to store the first type of intermediate data within a memory. The controlling device may be configured to generate print data using the first type of intermediate data within the memory in accordance with the print condition after accepting the setting instruction. The controlling device may be configured to supply the print data to a print performing unit.

9 Claims, 6 Drawing Sheets

CONTROLLING DEVICE

CROSS-REFERENCE TO RELATED APPLICATION

This application claims priority to Japanese Patent Application No. 2010-177562 filed on Aug. 6, 2010, the contents of which are hereby incorporated by reference into the present application.

TECHNICAL FIELD

The present specification discloses a controlling device for causing a print performing unit to print an image represented by data.

DESCRIPTION OF RELATED ART

An art for printing an image represented by web page data is known. In this art, a control unit of a multi-function device converts the web page data into print data written in PDL (Page Description Language) after a user sets a print condition.

SUMMARY

In a case of displaying on a displaying unit an image represented by web page data, a controlling device (the control unit, in the example mentioned above) uses the web page data stored in a memory of the controlling device, to display the image. The web page data is normally configured by a plurality of files associated with each other.

In a state that the plurality of files is stored in the memory of the controlling device, for example, some of the plurality of files are possibly deleted or rewritten by an application that has no relation with displaying the image represented by the web page data. On such occurrence, even when printing is performed according to the print data generated from the web page data, the image represented by the web page data is printed, with a part of the image missing.

The present specification provides an art capable of preventing an original image from being printed with a part thereof missing, in a case where printing of the original image is instructed, the original image being represented by original data configured by a plurality of files associated with each other.

An art disclosed by the present specification is a controlling device for causing a print performing unit to print an original image represented by original data. The original data may be included in a plurality of files associated with each other. The controlling device may comprise an intermediate data generating unit, a storage controlling unit, a print data generating unit. The intermediate data generating unit may be configured to generate a first type of intermediate data using the original data after accepting a print instruction for printing the original image and before accepting a setting instruction for setting a print condition from a user. The storage controlling unit may be configured to store the first type of intermediate data within a memory. The print data generating unit may be configured to generate print data using the first type of intermediate data within the memory in accordance with the print condition after accepting the setting instruction. The supplying unit may be configured to supply the print data to the print performing unit.

A control method and a computer program for realizing the controlling device described above, and a computer readable recording device which includes the computer program, are also novel and useful.

EMBODIMENT

Figure 1:
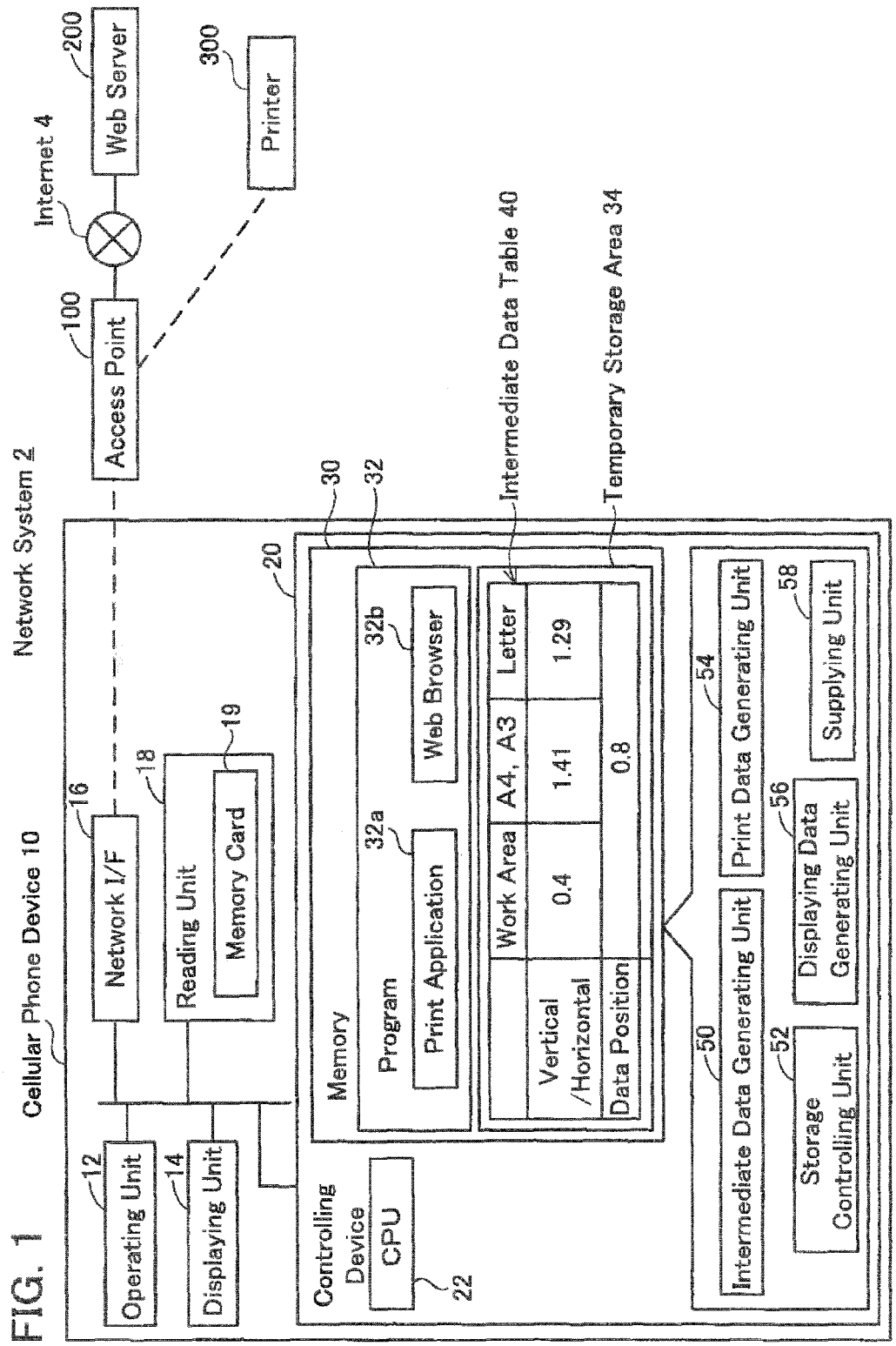
FIG. 1 shows a configuration of a network system.

First Embodiment (Configuration of a Network System)
As shown in FIG. 1, a network system 2 comprises a cellular phone device 10, an access point 100, a web server 200, and a printer 300. The cellular phone device 10 is connected wirelessly and communicably to the access point 100. The access point 100 is connected communicably to the web server 200 by the Internet 4. The access point 100 is also connected wirelessly and communicably to the printer 300. In other words, the cellular phone device 10 is capable of communicating with the web server 200 and the printer 300 via the access point 100. The printer 300 can print, on a print sheet, an image that is represented by print data acquired from an external device (e.g., the cellular phone device 10). Note that the dashed lines shown in FIG. 1 indicate that devices at either end of each of the dashed lines are capable of communicating with each other wirelessly.

(Configuration of the Cellular Phone Device)
The cellular phone device 10 comprises an operating unit 12, a displaying unit 14, a network interface 16, a reading unit 18, and a controlling device 20. The reading unit 18 is capable of reading data stored in a memory card (i.e., an external storage device) 19 inserted into the reading unit 18, and writing data into the memory card 19.

The controlling device 20 comprises a CPU 22 and a memory 30. The CPU 22 performs processes in accordance with a program 32 within the memory 30. The program 32 includes a print application 32a and a web browser 32b. Functions of an intermediate data generating unit 50, a storage controlling unit 52, a print data generating unit 54, a displaying data generating unit 56, and a supplying unit 58 are realized when the CPU 22 performs processes in accordance with the print application 32a. Note that the print application 32a may be preinstalled in the cellular phone device 10 before shipment of the cellular phone device 10, may be installed from a server provided by a manufacturer of the printer 300, into the cellular phone device 10, or may be installed from a medium such as the memory card 19 into the cellular phone device 10.

The CPU 22 is capable of acquiring web data from the web server 200, storing the web data in a temporary storage area 34 (described hereinafter), and displaying on the displaying unit 14 an original image represented by the web data stored in the temporary storage area 34, by performing processes in accordance with the web browser 32b. Note that the web data is configured by a plurality of files. The controlling device 20 acquires the web data representing the original image, by acquiring the plurality of files from the web server 200.

The plurality of files includes at least an HTML file in a vector format. The HTML file includes data that indicates sizes and positions of a plurality of objects configuring the original image (a text object, an image object, etc.) to be displayed on the displaying unit 14.

Note that the HTML file may include text data for displaying the text object. The HTML file may or may not also include image data for displaying the image object. In the latter case, the plurality of files further includes an image file that includes the image data (e.g., a JPEG (Joint Photographic Experts Group) file), and the HTML file includes data indicating a file name of the image file.

In the example described above, the plurality of files include the HTML file and the image file. The HTML file includes the data indicating the file name of the image file. This means, therefore, that the plurality of files is associated with each other. That is, the web data is included in the plurality of files associated with each other. Note that the plurality of files may further include a file other than the one described in the above example (e.g., a file that includes data for decorating the objects).

The memory 30 comprises the temporary storage area 34. The temporary storage area 34 temporarily stores data that are generated in the course of a process performed by the CPU 22. For instance, the temporary storage area 34 stores an intermediate data table 40 therein. The intermediate data table 40 is utilized when intermediate data (described hereinafter) is generated. Note that the temporary storage area 34 temporarily stores data acquired from the outside. For example, the temporary storage area 34 temporarily stores the web data acquired from the web server 200.

(Processes Performed by the Controlling Device)

Figure 2:
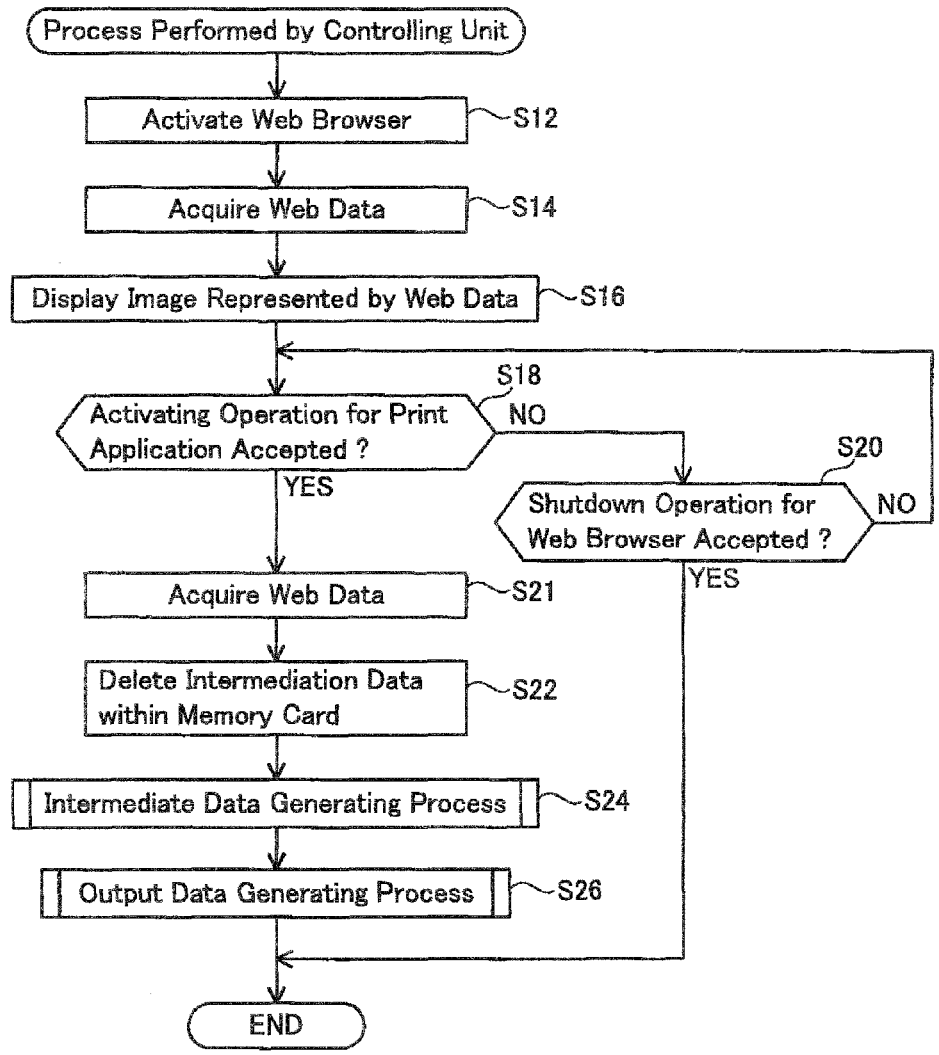
FIG. 2 shows a flowchart of processes performed by a controlling device.

Next, a process performed by the controlling device 20 is described with reference to FIG. 2. When a user causes the operating unit 12 to perform an operation for activating the web browser 32b, the process shown in FIG. 2 is started. The CPU 22 first activates the web browser 32b (S12). The CPU 22 acquires, from the web server 200, the web data (i.e., the plurality of files) that is specified by a URL (Uniform Resource Locator) designated by the user (S14). The CPU 22 stores the acquired web data in the temporary storage area 34. Subsequently, the CPU 22 causes a displaying area (screen) of the displaying unit 14 to display an original image represented by the web data (S16).

The user may perform an activation operation for activating the print application 32a to the operating unit 12, with the original image being displayed on the displaying unit 14. The CPU 22 monitors that the activation operation from the user is accepted (S18). When the activation operation from the user is accepted (YES in S18), the process continues to S21.

The user may also perform a shutdown operation for shutting down the web browser 32b to the operating unit 12. The CPU 22 monitors that the shutdown operation from the user is accepted (S20). When the CPU 22 accepts the shutdown operation (YES in S20) without accepting the activation operation (NO in S18), the CPU 22 shuts down the web browser 32b and ends this process. Note that when the CPU 22 accepts neither the activation operation (NO in S18) nor the shutdown operation (NO in S20), the CPU 22 monitors that the activation operation from the user is accepted again (S18).

When the result of S18 is YES, the CPU 22 performs the processes from S21 to S26 in accordance with the print application 32a. In S21, the CPU 22 acquires the abovementioned web data specified by the URL (i.e., the web data representing the original image described above), from the web server 200, and stores the web data in the temporary storage area 34. Next, when an intermediate file (a print intermediate file or a display intermediate file, described hereinafter) is stored within the memory card 19, the storage controlling unit 52 deletes the intermediate file (S22). As a result, the storage controlling unit 52 can store new data in an area within the memory card 19 in which the intermediate file had been stored. Subsequently, the intermediate data generating unit 50 performs an intermediate data generating process (S24), and the print data generating unit 54 and displaying data generating unit 56 perform an output data generating process (S26).

(Intermediate Data Generating Process)

The intermediate data generating process that is performed in S24 by the intermediate data generating unit 50 is described next with reference to FIG. 3. In the intermediate data generating process, the web data acquired in S14 of FIG. 2 is converted into intermediate data in bitmap format (more specifically, RGB bitmap format).

The intermediate data generating unit 50 utilizes the temporary storage area 34 to generate the intermediate data. The temporary storage area 34 of the cellular phone device 10 has a relatively small capacity (compared to a PC and the like). Therefore, in the intermediate data generating process, a plurality of print partial intermediate data is generated sequentially by sequentially using a plurality of partial data configuring the web data, instead of adopting a method of using all of the web data to generate a single file that includes print intermediate data.

First, the intermediate data generating unit 50 acquires, from the printer 300, print conditions that can be performed by the printer 300 (S42). The print conditions include the size of a print sheet on which the printer 300 is capable of performing printing, and the print resolution. In the present embodiment, the printer 300 is capable of performing printing on the letter size (8.5 inches×11 inches), A4 size (210 mm×297 mm) and A3 size (297 mm×420 mm) print sheet. Further, the printer 300 is capable of performing printing at a print resolution of 300 dpi or 600 dpi. Note, in the present embodiment, that the printer 300 performs printing such as the same print resolution for both a vertical direction (long side direction) and a horizontal direction (short side direction) of the print sheet.

Next, the intermediate data generating unit 50 determines the number of pixels in the horizontal direction of each print partial intermediate data (S46). Specifically, the intermediate data generating unit 50 specifies, from among the print conditions acquired in S42, a print condition that obtains the maximum number of pixels (the number of dots) in the horizontal direction. In the present embodiment, a combination of an A3 print sheet and a 600 dpi print resolution is specified. The intermediate data generating unit 50 then determines the number of pixels in the horizontal direction of the print partial intermediate data by multiplying a horizontal width (unit: inches) of the A3 print sheet by the 600 dpi print resolution.

In the present embodiment, the "horizontal width of the print sheet" means the length obtained by subtracting the sizes of margins from the total horizontal width of the print sheet. The term "vertical width of the print sheet," described hereinafter, also means the same. Note that the sizes of the margins are previously determined in the printer 300 of the present embodiment, in accordance with the size of the print sheet. In addition, the size of the print sheet that is acquired from the printer 300 includes the sizes of the margins.

Subsequently, the intermediate data generating unit 50 determines the number of pixels in the vertical direction of the print partial intermediate data by using the number of pixels in the horizontal direction of the print partial intermediate data determined in S46 and a previously determined capacity of a work area within the temporary storage area 34 (S48). More specifically, the intermediate data generating unit 50 specifies the maximum number of pixels within a range that can be stored within the capacity of the work area of the temporary storage area 34, and then determines the number of pixels in the vertical direction by diving this maximum number of pixels by the number of pixels in the horizontal direction determined in S46.

Next, the intermediate data generating unit 50 divides the number of pixels in the vertical direction determined in S48, by the number of pixels in the horizontal direction determined in S46. This calculates an aspect ratio ("0.4" in the present embodiment) of the pixels of one print partial intermediate data that has the maximum data size creatable within the work area. Hereinafter, this calculated value "0.4" is referred to as "the maximum aspect ratio." The intermediate data generating unit 50 registers the maximum aspect ratio "0.4" in the intermediate data table 40 (see FIG. 1) (S50).

The intermediate data generating unit 50 then divides the number of pixels in the vertical direction that can be printed on the print sheet, by the number of pixels in the horizontal direction that can be printed on the print sheet, for each size of print sheet (A4, A3, letter) that is indicated by the print conditions acquired in S42. In the present embodiment, an aspect ratio of "1.41" is calculated for the A4 and A3 sizes, and the aspect ratio of "1.29" is calculated for the letter size. Consequently, the aspect ratio of the pixels that is capable of being printed on the print sheet can be calculated for each size. The calculated values "1.41" and "1.29" are each referred to as "print sheet aspect ratio," hereinafter.

The intermediate data generating unit 50 registers the print sheet aspect ratios "1.41" and "1.29" in the intermediate data table 40 (S52). In other embodiments, the intermediate data generating unit 50 may perform, beforehand, at least one of the processes of S42 to S52. For instance, in a case of communicable connection with the printer 300, the intermediate data generating unit 50 may perform the processes of S42 to S52. Furthermore, when the print conditions that can be performed by the printer 300 are previously incorporated in the print application 32a itself, the intermediate data generating unit 50 may perform the processes of S42 to S52 without communicating with the printer 300.

Next, the intermediate data generating unit 50 generates one print intermediate file that includes one print partial intermediate data using web data 400 (see FIG. 5) acquired in S14 of FIG. 2 (S54). Specific examples of the process in which the intermediate data generating unit 50 generates the print intermediate file will be described.

Figure 5:
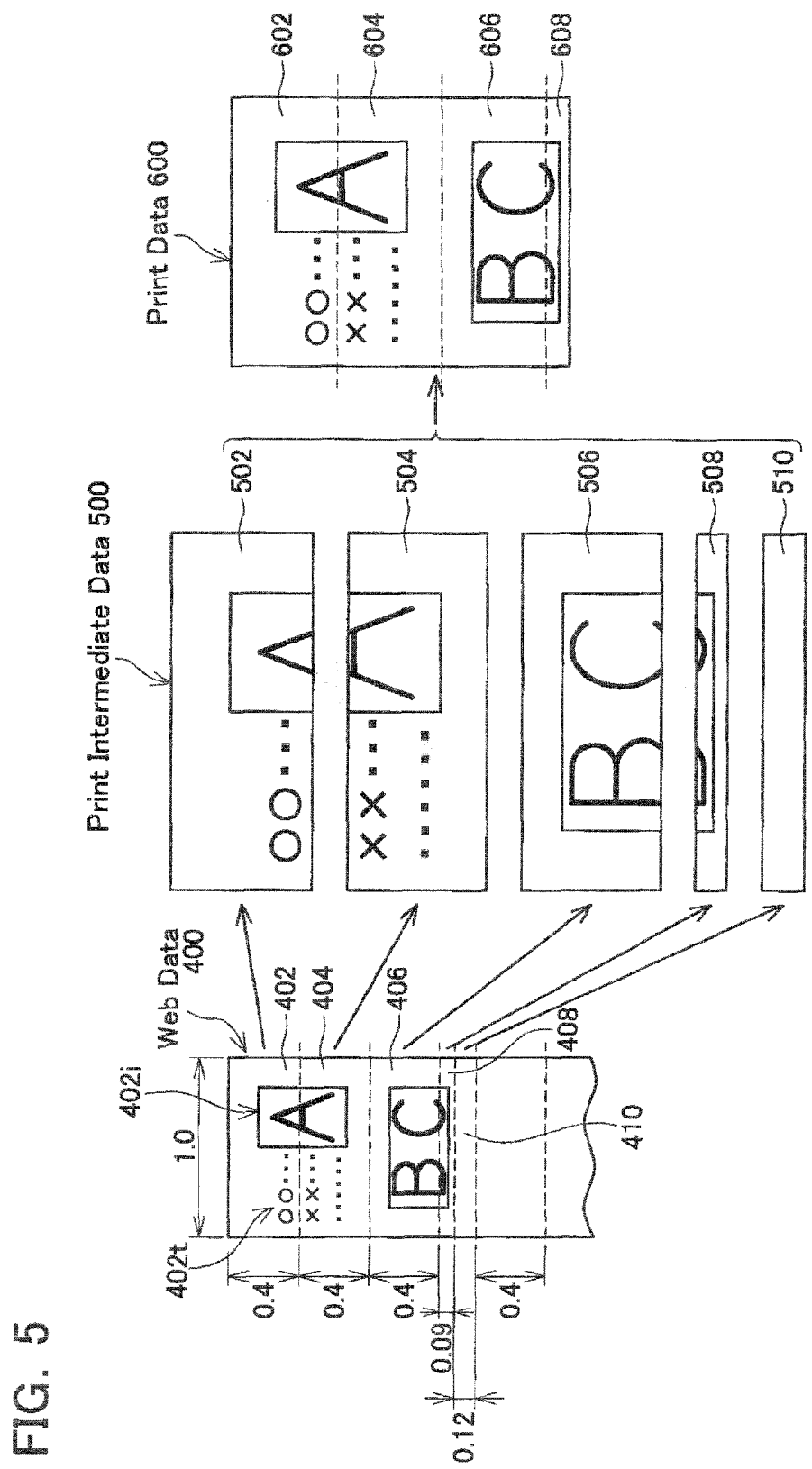
FIG. 5 shows a diagram for explaining a procedure of generating print data from web data.

First, the intermediate data generating unit 50 sets a value of a "data position" of the intermediate data table 40 (see FIG. 1) at "0." Next, the intermediate data generating unit 50 specifies a minimum value (0.4) based on a value (0.4 (=0+ 0.4)) that is obtained by adding the value of the "data position" (0) and the maximum aspect ratio (0.4) and registered in the intermediate data table 40, as well as on the print sheet aspect ratios (1.41 and 1.29) (specifies 0.4 based on 0.4<1.29<1.41). As shown in FIG. 5, the intermediate data generating unit 50, using the web data 400, generates, within the work area, one print partial intermediate data 502 (in RGB bitmap format) which represents a partial image 402 between the position of the value of the current "data position" (0) and the position of the abovementioned minimum value (0.4).

Note that the partial image 402 includes a part of a text object 402t and a part of an image object 402i. Therefore, from among a plurality of files configuring the web data 400, the intermediate data generating unit 50 generates one item of the print partial intermediate data 502 representing the partial image 402 using a file that includes the text object 402t and a file that includes the image object 402i. In the print partial intermediate data representing the partial image 402, the number of pixels in the horizontal direction corresponds to the number of pixels determined in S46, and the number of pixels in the vertical direction corresponds to the number of pixels in the vertical direction determined in S48.

Subsequently, the intermediate data generating unit 50 generates, within the work area, one print intermediate file including one item of the print partial intermediate data 502. More specifically, the intermediate data generating unit 50 generates the one print intermediate file by compressing the print partial intermediate data 502 using a PNG (Portable Network Graphics) compression algorithm. Once the one print intermediate file is generated, the storage controlling unit 52 stores the print intermediate file in the memory card 19 (S56). Once S56 is ended, the storage controlling unit 52 deletes the data within the work area (the print partial intermediate data and print intermediate file). The intermediate data generating unit 50 further updates the value of the "data position" of the intermediate data table 40 to "0.4," which indicates the position of a lower end of the partial image 402.

Subsequently, the intermediate data generating unit 50 determines whether the print intermediate file is generated or not using all of the entire web data 400 (S58). In a case where the result of this step is NO, the process is returned to S54. When the process is returned to S54, the intermediate data generating unit 50 specifies the minimum value (0.8) based on a value (0.8 (=0.4+0.4)) that is obtained by adding the value of the current "data position" (0.4) and the maximum aspect ratio (0.4) that are registered in the intermediate data table 40, as well as based on the print sheet aspect ratios (1.41 and 1.29) (specifies 0.8 based on 0.8<1.29<1.41). The intermediate data generating unit 50 generates one print partial intermediate data 504 that represents a partial image 404 between the position of the value of the current "data position" (0.4) and the position of the minimum value (0.8), and compresses the print partial intermediate data 504, to generate one print intermediate file.

The intermediate data generating unit 50 further generates a plurality of print intermediate files representing a plurality of print partial intermediate data 506, 508, 510, by repeatedly performing the processes from S54 to S58 described above. Note that the print partial intermediate data 506 is a print partial intermediate data representing a partial image 406 between a position 0.8 and a position 1.2. The print partial intermediate data 508 is a print partial intermediate data representing a partial image 408 between the position 1.2 and a position 1.29. The print partial intermediate data 510 is a print partial intermediate data representing a partial image 410 between the position 1.29 and the position 1.41.

In a case where a print sheet aspect ratio of 1.29 is specified as the minimum value in S54, the intermediate data generating unit 50 converts a value (2.58), which is obtained by adding the print sheet aspect ratio (1.29) to the specified minimum value, into 1.29 registered in the intermediate data table 40, and registers this value 1.29 therein. The same is true for a case in which the print sheet aspect ratio 1.41 is specified as the minimum value.

As described above, the position 1.29 is the aspect ratio for the letter size. Thus, in a case of printing on a letter-sized print sheet, the print data utilized for printing on a first print sheet capable of being generated by using the four print partial intermediate data 502 to 508 corresponding to the positions 0 to 1.29. Also, the position 1.41 is the aspect ratio of the size A4 or A3, as described above. Therefore, when printing on an A4 or A3 print sheet, the print data that is utilized for printing on the first print sheet is capable of being generated using the five print partial intermediate data 502 to 510 corresponding to the positions 0 to 1.41. Note that the plurality of print partial intermediate data included in the plurality of print intermediate files within the memory card 19 is collectively called "print intermediate data 500," hereinafter.

As is clear from the above descriptions, the intermediate data generating unit 50 generates one print partial intermediate data that has the number of pixels in the horizontal direction determined in S46 and the number of pixels in the vertical direction determined in S48 or lower number of pixels. In other words, the intermediate data generating unit 50 does not generate the print partial intermediate data for a data size that exceeds the maximum data size of the print partial intermediate data that can be generated using the work area within the temporary storage area 34. Furthermore, when the print intermediate files are stored in the memory card 19, the intermediate data generating unit 50 deletes the data stored in the work area (the print intermediate files and the print partial intermediate data). This configuration can prevent the occurrence of a situation where the intermediate data generating unit 50 can no longer generate the print intermediate data 500 due to insufficient capacity of the work area within the temporary storage area 34.

When the print intermediate file is generated using all of the web data 400 (YES in S58), the intermediate data generating unit 50 acquires a horizontal width of a displaying area (stored previously in the memory 30) of the displaying unit 14 (see FIG. 1) (S60). Next, the intermediate data generating unit 50 generates display intermediate data in JPEG format by using the plurality of print intermediate files within the memory card 19 (S62 to S66).

First, in S62 the intermediate data generating unit 50 selects a set of the oldest print intermediate file from the plurality of print intermediate files that are generated sequentially. The intermediate data generating unit 50 then generates the print partial intermediate data 502 in the work area of the temporary storage area 34 by expanding the selected print intermediate file (compressed in PNG format). Next, the intermediate data generating unit 50 adjusts (i.e., reduces) the number of pixels of the print partial intermediate data 502 so that the length in the horizontal direction of the partial image represented by the print partial intermediate data 502 matches the horizontal width of the displaying area, and then generates display partial intermediate data. Thereafter, the intermediate data generating unit 50 deletes, from the work area, the print partial intermediate data 502, which is a source of the display partial intermediate data.

Similarly, the intermediate data generating unit 50 selects one print intermediate file from the plurality of print intermediate files in chronological order of generating the print intermediate files, to perform the processes described above. When the display partial intermediate data within the work area increase, a free space of the work area decreases. Due to the deficiency in the free space of the work area, the intermediate data generating unit 50 continues to generate the display partial intermediate data until the display partial intermediate data can no longer be generated. When the display partial intermediate data is no longer generated, the intermediate data generating unit 50 generates one display intermediate file by compressing the display partial intermediate data within the work area using a JPEG compression algorithm. As is clear from the descriptions above, one display intermediate file is capable of being generated from two or more of the print intermediate files in the present embodiment.

When the one display intermediate file is generated, the storage controlling unit 52 stores this display intermediate file in the memory card 19 (S64). Next, the intermediate data generating unit 50 deletes the data stored in the work area (the display partial intermediate data, the display intermediate file). The intermediate data generating unit 50 determines whether the display intermediate file is generated using all of the print intermediate files or not (S66). In a case where the display intermediate file is generated using all of the print intermediate files (YES in S66), the intermediate data generating process is ended.

In a case where the display intermediate file is not generated using all of the print intermediate files (NO in S66), the process is returned to S62. As a result, the display intermediate files are generated from the rest of the print intermediate files, and the display intermediate files are stored in the memory card 19. Specifically, two or more display intermediate files are stored in the memory card 19.

(Output Data Generating Process)

The output data generating process of S26 shown in FIG. 2 is described next with reference to FIG. 4. In the output data generating process, the print data used by the printer 300 (see FIG. 1) for performing printing and the displaying data used by the displaying unit 14 for displaying a print preview image, are generated.

The supplying unit 58 supplies the displaying unit 14 with data that represents a setting screen for allowing the user to set the print conditions (the size of each print sheet, the number of prints, selection of color printing or black-and-white printing, scales, Nin1 printing, etc.). Consequently, the setting screen is displayed on the displaying unit 14. The user may set the print conditions by operating the operating unit 12. The print conditions include the size of the print sheet and the print resolution. The displaying data generating unit 56 monitors that a setting operation from the user is accepted (S72). When the setting operation is accepted by the displaying data generating unit 56 (YES in S72), the displaying data generating unit 56 stores the print conditions set by the user in the memory 30.

Once the setting operation is accepted (YES in S72), the displaying data generating unit 56 acquires the horizontal width and vertical width (stored previously in the memory 30) of the displaying area of the screen displayed on the displaying unit 14 (see FIG. 1) (S74). Next, the displaying data generating unit 56 acquires the size of the print sheet (e.g., letter size) indicated by the set print conditions (S76).

Subsequently, the displaying data generating unit 56 compares a value of "the horizontal width of the print sheet/the horizontal width of the displaying area" (referred to as "horizontal width ratio," hereinafter) with a value of "the vertical width of the print sheet/the vertical width of the displaying area" (referred to as "vertical width ratio," hereinafter) (S78). In a case where the horizontal width ratio is equal to or greater than the vertical width ratio (YES in S78), the displaying data generating unit 56 generates displaying data that represents an image having the horizontal width matching the horizontal width of the displaying area of the displaying unit 14 (S80). More specifically, the displaying data generating unit 56 first sequentially generates the display partial intermediate data (in RGB bitmap format) in the work area of the temporary storage area 34 by sequentially expanding the display intermediate files stored in the memory card 19. Next, the displaying data generating unit 56 generates the displaying data that represent the print preview image corresponding to the first print sheet using each of the display partial intermediate data.

Note that the displaying data generating unit 56 generates the displaying data corresponding to the first print sheet so that the ratio between the number of pixels in the horizontal direction of the displaying data corresponding to the first print sheet and the number of pixels in the vertical direction of the same matches the print sheet aspect ratio (e.g., 1.29) of the size of the print sheet set by the user (e.g., the letter size). As described above, the number of pixels in the horizontal direction of the display partial intermediate data corresponds to the horizontal width of the displaying area on the displaying unit 14. For this reason, when generating the displaying data, the displaying data generating unit 56 does not need to perform a process for adjusting the number of pixels in the horizontal direction. Moreover, the time for generating the displaying data can be shortened.

Note that, when there exist the print preview images corresponding to the second and subsequent print sheets, the displaying data generating unit 56 generates the displaying data corresponding to the second and subsequent print sheets, in the same manner as generating the displaying data corresponding to the first print sheet. As a result, the displaying data that represents one or more print preview images corresponding to one or more print sheets is completed.

On the other hand, in a case where the horizontal width ratio is smaller than the vertical width ratio (NO in S78), the displaying data generating unit 56 generates the displaying data that represents an image having a vertical width matching the vertical width of the vertical width of the displaying area (S82). More specifically, as with S80, the displaying data generating unit 56 generates the displaying data corresponding to the first print sheet, so that the ratio between the number of pixels in the horizontal direction of one displaying data and the number of pixels in the vertical direction of the same matches the print sheet aspect ratio (e.g., 1.29) of the size of the print sheet set by the user (e.g., the letter size). Next, the displaying data generating unit 56 adjusts (i.e., reduces) the number of pixels of the displaying data so that the number of pixels in the vertical direction of the displaying data corresponding to the first print sheet corresponds to the vertical width of the displaying area of the displaying unit 14. Similarly, the displaying data generating unit 56 generates the displaying data corresponding to the second and subsequent print sheets.

The supplying unit 58 supplies the displaying unit 14 with the displaying data generated in S80 or S82 (S84). As a result, the print preview image represented by the displaying data is displayed on the displaying unit 14. The user can check the print preview image and determine whether or not to cause the printer 300 to print the image under the print conditions that are input in S72.

Note that, in the present embodiment, the displaying data is supplied automatically to the displaying unit 14, once the setting operation is accepted; however, in the other embodiments, the supplying unit 58 may supply the displaying unit 14 with the print preview image, once a predetermined instruction from the user (e.g., a predetermined operation to be performed on the operating unit 12 by the user) is accepted after the setting operation is accepted.

Next, the user can cause the operating unit 12 to perform a starting operation for starting the printing. The print data generating unit 54 monitors that the starting operation is accepted (S86). Once the starting operation is accepted (YES in S86), the print data generating unit 54 performs a process for generating print data 600 (see FIG. 5) (S88 to S104) using the plurality of print intermediate files stored in the memory card 19. The user is capable of performing a cancellation operation for cancelling the print conditions set in S72 to the operating unit 12. Once the cancellation operation is accepted without accepting the starting operation (NO in S86), the print data generating unit 54 monitors that the setting operation from the user is accepted again (S72).

In the other embodiments, when the print data generating unit 54 does not accept the setting operation from the user in S72 (NO in S72), the process may continue to S86 where the print data generating unit 54 monitors that the starting operation is accepted. In this case, the print data generating unit 54 may repeatedly perform the processes of S72 and S86 until accepting the setting operation or accepting the starting operation regardless of accepting the cancellation operation or not. In a case of accepting the starting operation (YES in S86) without accepting the setting operation (NO in S72), the print data generating unit 54 may perform the processes subsequent to S88 in accordance with the print conditions that are set by default in the print application 32a or the print conditions that are previously stored in the memory 30 (e.g., the print conditions that are set in S72 when the previous print data is generated, the print conditions that are previously set by the user, etc.). Note that, in this case, the displaying data generating unit 56 may not generate the displaying data.

First, the print data generating unit 54 acquires a set of the oldest print intermediate file from the plurality of print intermediate files that is sequentially generated and stored in the memory card 19 (S88). The print data generating unit 54 expands the set of the print intermediate file (compressed in PNG format) and generates one item of the print partial intermediate data 502 in the work area within the temporary storage area 34.

Next, the print data generating unit 54 generates partial print data using the print partial intermediate data 502 (S90). More specifically, the print data generating unit 54 adjusts the number of pixels of the partial intermediate data 502 in accordance with the size of the print sheet and the print resolution that are indicated by the print conditions set in S72.

The number of pixels in the horizontal direction of the print partial intermediate data 502 matches the number of pixels in the print condition that obtains the maximum number of pixels in the horizontal direction, the print condition being one of the print conditions that can be performed by the printer 300. Therefore, in a case where the print conditions set in S72 indicate the print condition for obtaining the maximum number of pixels (data size) (e.g., A3, 600 dpi), the print data generating unit 54 does not need to adjust the number of pixels of the print partial intermediate data 502. In a case where, on the other hand, the print conditions set in S72 do not indicate the print condition for obtaining the maximum number of pixels, the print data generating unit 54 adjusts so as to reduce the number of pixels of the print partial intermediate data 502. According to this configuration, the print data generating unit 54 does not need to increase the number of pixels of the print partial intermediate data 502.

The process of S90 generates a partial print data 602 in bitmap format (see FIG. 5). Although not shown in the flowchart, such a parameter as "the current number of pixels in the vertical direction" is stored in the memory 30. In S90, the print data generating unit 54 updates the current number of pixels in the vertical direction by adding the number of pixels in the vertical direction of the partial print data 602 to the current number of pixels in the vertical direction (0), which is stored in the memory 30. Note that the current number of pixels is utilized in a determination made in S94, which is described hereinafter. The print data generating unit 54 then utilizes the JPEG compression algorithm to compress the partial print data 602, thereby generating a print file (JPEG file) (S92).

Subsequently, the print data generating unit 54 determines whether the print data corresponding to one print sheet is completed or not (S94). More specifically, the print data generating unit 54 calculates the number of pixels in the vertical direction that is required in performing printing on the one print sheet (referred to as "the required number of pixels," hereinafter), by multiplying the vertical width (unit: inches) of the size of the print sheet (e.g., the letter size) indicated by the print conditions set in S72, by the print resolution (e.g., 300 dpi) indicated by the print conditions set in S72. In S94, the print data generating unit 54 determines whether the print data corresponding to the one print sheet are completed or not, by determining whether the current number of pixels in the vertical direction, stored in the memory 30, matches the required number of pixels described above.

In a case where the result of S94 is YES, the print data generating unit 54 adds data indicating the end of printing performed on the one print sheet (referred to as "end data," hereinafter), to the print file generated in S92. Next, the supplying unit 58 supplies the print file including the end data to the printer 300 (S96). Note that, in the present embodiment, because the result of S94 is determined as NO at the point of time when the partial print data 602 is generated, the print data generating unit 54 supplies the print file that does not include the end data, to the printer 300 (S98). As a result, the printer 300 prints out, on the first print sheet, an image that is represented by the partial print data 602 acquired from the cellular phone device 10.

Subsequently, the print data generating unit 54 determines whether all of the plurality of print intermediate files within the memory card 19 are processed or not (S100). When not all of the plurality of print intermediate files are processed (NO in S100), the print data generating unit 54 returns to S88. As a result, the print data generating unit 54 acquires and expands a print intermediate file that is generated subsequent to the print intermediate file acquired in the previous S88, and generates the print partial intermediate data 504 in the work area of the temporary storage area 34. The print data generating unit 54 then generates partial print data 604 (FIG. 5) using the print partial intermediate data 504 (S90) and generates a print file (S92), in the same manner described above.

In the present embodiment, when the partial print data 604 is generated, the result of S94 is determined as NO. Thus, the supplying unit 58 supplies the print file (i.e., the partial print data 604) that does not include the end data, to the printer 300 (S98). As a result, the printer 300 prints out an image represented by the partial print data 604, on the first print sheet that is same as the print sheet, on which the image represented by the partial print data 602 is printed, so that the image represented by the partial print data 604 is continuous from the image represented by the partial print data 602.

Similarly, the print data generating unit 54 generates a print file that includes partial print data 606 (FIG. 5) using the print partial intermediate data 506 included in the subsequent print intermediate file (S92). The supplying unit 58 supplies the print file (i.e., the partial print data 606) that does not include the end data, to the printer 300 (S98).

For example, in a case where the print condition set by the user indicates the letter size, and a print file including partial print data 608 (see FIG. 5) is generated using the print partial intermediate data 508 included in the subsequent print intermediate file (S92), the result of S94 is determined as YES. In this case, the supplying unit 58 supplies the print file (i.e., the partial print data 608) including the end data, to the printer 300 (S96). When the print file is supplied in S96 or S98, the print data generating unit 54 deletes the data stored in the work area (the print file, partial print data).

In this case, the printer 300 can find out that the printing on the one letter-sized print sheet is ended. The printer 300 prints out the image represented by the partial print data 608, on the first print sheet that is same as the print sheet on which the images represented by the partial print data 602, 604 and 606 are printed, and then ejects the print sheet. As a result, when the printer 300 supposedly acquires the subsequent print file from the cellular phone device 10, the printer 300 can print out an image represented by the partial print data included in this new print file, on the second letter-sized print sheet. Once S96 is ended, the print data generating unit 54 changes the current number of pixels in the vertical direction, which is stored in the memory 30, to "0." Accordingly, the result of S94 is determined as NO until the print data corresponding to the second print sheet are completed.

In the case where, for example, the print conditions set by the user indicate the A3 or A4 size, even when the print file that includes the partial print data 608 (see FIG. 5) is generated using the print partial intermediate data 508 included in the print intermediate file (S92), and the result of S94 is determined as NO. In this case, when the print file including the partial print data is generated using the print partial intermediate data 510 included in the further subsequent print intermediate file (S92), the result of S94 is determined as YES.

As described above, in the present embodiment, the size of the image represented by the print partial intermediate data 508 (from the position 1.2 to position 1.29) is determined in accordance with the print sheet aspect ratio of the letter-sized print sheet. In addition, the size of the image represented by the print partial intermediate data 510 (the position 1.29 to position 1.41) is determined in accordance with the size of the A4 print sheet or the like. Therefore, in a case where, for example, the letter-sized print sheet is set as the print condition, and the partial print data is generated using the print partial intermediate data 508 in S90, the print data corresponding to the first letter-sized print sheet are completed. In addition, in a case where, for example, the A4 print sheet is set as the print condition, and the partial print data is generated using the print partial intermediate data 510 in S90, the print data corresponding to the first A4 print sheet are completed.

In other words, even when printing is performed on a print sheet of any size that can be printed by the printer 300, none of the plurality of partial images represented by the plurality of print partial intermediate data 502 to 510 of the memory card 19 is printed over the first and second print sheets. Similarly, none of the plurality of partial images is printed over two or more print sheets (e.g., the second and third print sheets).

If a single print intermediate file is supposedly configured such that one partial image represented by one print partial intermediate data is printed over the first and second print sheets, the print data generating unit 54 needs to operate as follows.

Specifically, when generating the print data corresponding to one of two print sheets, the print data generating unit 54 specifies part of the data from one intermediate file. When generating the print data corresponding to the other one of the two print sheets, the print data generating unit 54 specifies part of the data from the same one intermediate file. Therefore, the print data generating unit 54 requires time for specifying part of the data from the one intermediate file. In the present embodiment, however, the time for generating the print file is reduced because the print data generating unit 54 does not need to specify a part of the data from the one intermediate file.

Note that, when all of the plurality of print intermediate files within the memory card 19 is processed (YES in S100), the print data generating unit 54 ends the output data generating process. In so doing, the print data generating unit 54 may supply the data indicating the end of printing, to the printer 300. Consequently, the printer 300 can find out the end of printing and eject the print sheet on which the image represented by the final print file is printed.

Even after the displaying data and print data is generated, the storage controlling unit 52 maintains the situations of the print and display intermediate files stored in the memory card 19. In other words, until the print application 32a is activated again (until the result of S18 shown in FIG. 2 is determined as YES), the print and display intermediate files are maintained in the memory card 19. According to this configuration, in a case where the setting operation for setting the print conditions is accepted again after the end of the output data generating process, the displaying data and print data can be generated using the print and display intermediate files. Thus, when, for example, the user wishes to print the original image again under a print condition different than the print conditions that are input initially, the time for the acquisition of a print result can be reduced, and the original image can be prevented from being printed with a part thereof missing. In addition, the print data and displaying data is capable of being generated a number of times using the print and display intermediate data until a new activation operation for activating the print application 32a is accepted (YES in S18 in FIG. 2).

The above has described the embodiment in detail. In the state in which the web data is stored in the temporary storage area 34, in some cases some of the plurality of files configuring the web data is deleted or rewritten. In this circumstance, a plurality of the original image represented by the web data is missing. Especially when an application different from the print application 32a or the web browser 32b is activated in the state in which the controlling device 20 stores the web data in the temporary storage area 34, the circumstance described above is likely to occur.

When supposedly adopting a configuration in which the print data is generated using the web data after the setting operation for setting the print conditions is accepted (see S72 in FIG. 4), the length of time in which the web data is stored in the temporary storage area 34 becomes relatively long, increasing the risk of the circumstance described above.

After accepting the activation operation for activating the print application 32a (YES in S18 in FIG. 2), the controlling device 20 of the present embodiment generates the print intermediate data in bitmap format using the web data stored in the temporary storage area 34, and stores the print intermediate data in the memory card 19, before accepting the setting operation from the user. The controlling device 20 generates the print data using the print intermediate data in bitmap format, in place of the web data that might be used for deleting a file. As a result, the print data that represents the original image with a missing part are prevented from being generated, and the performing of printing the original image with a missing part can be inhibited. As with the case of the display intermediate data, generation of the displaying data that represents the original image with a missing part can be prevented, and, consequently, display of the original image with a missing part can be inhibited.

Figure 3:
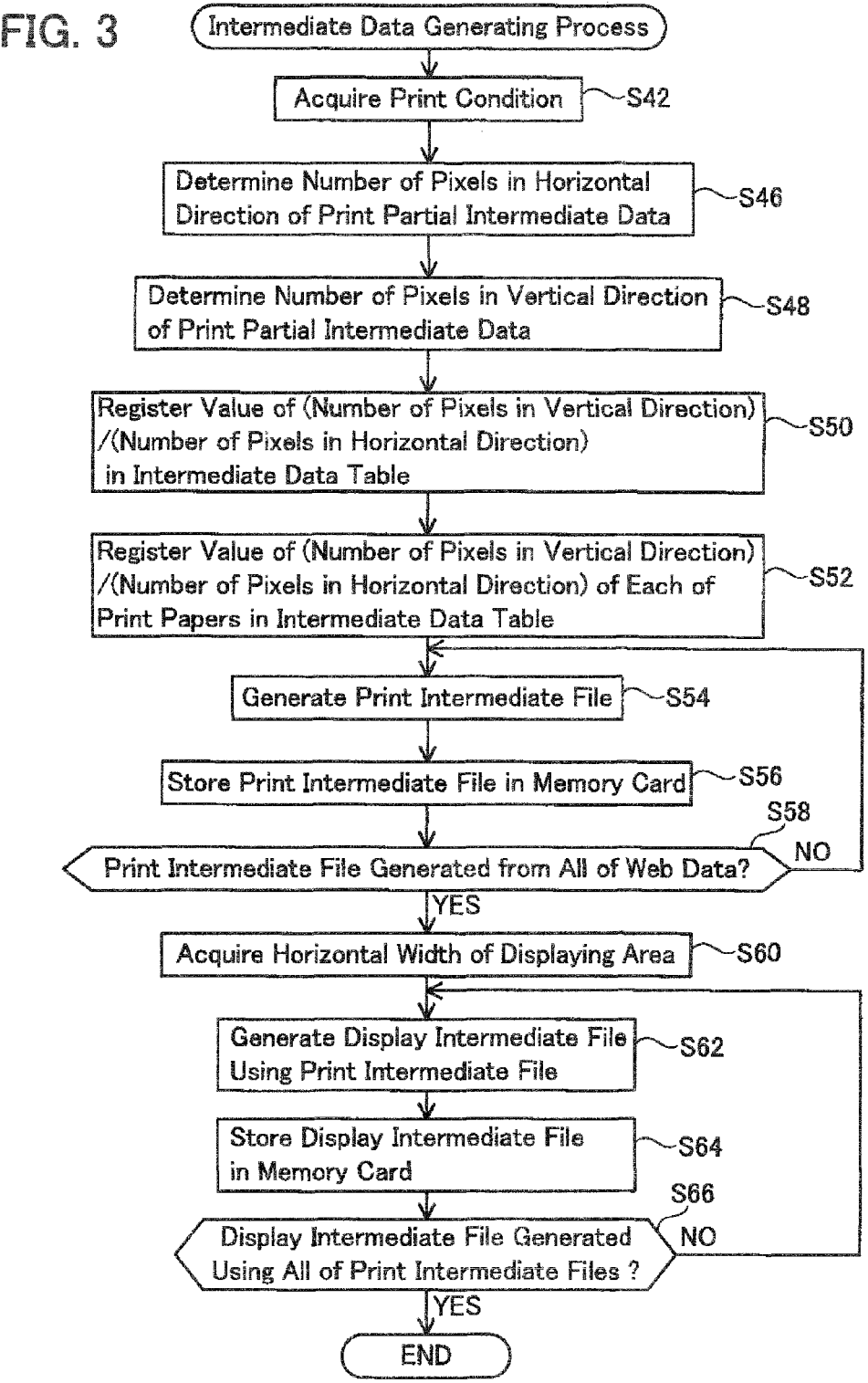
FIG. 3 shows a flowchart of an intermediate data generating process.

The intermediate data generating unit 50 generates the display intermediate data such that the sizes of the images represented by the display intermediate data are different from the sizes of the images represented by the print intermediate data (S62 to S66 in FIG. 3). According to this configuration, the intermediate data that represents images of appropriate sizes can be generated in accordance with the purpose of use of the image represented by each intermediate data.

Note that the web data, the print intermediate data and the display intermediate data are examples of the "original data," "first type of intermediate data" and "second type of intermediate data," respectively. The print partial intermediate data and the print intermediate file are examples of the "partial intermediate data" and "intermediate file," respectively. The activation operation for activating the print application 32a, the setting operation for setting the print conditions, and the starting operation for starting printing are examples of the "print instruction," "setting instruction," and "starting instruction," respectively.

Second Embodiment

The differences with the first embodiment are described. In the present embodiment, the intermediate data generating unit 50 does not perform the process of S52 shown in FIG. 3. The intermediate data generating unit 50 generates the print partial intermediate data in the number of pixels determined in S46 and S48. As a result, an image represented by one print partial intermediate data is likely to be printed over two print sheets.

(Output Data Generating Process)

Figure 4:
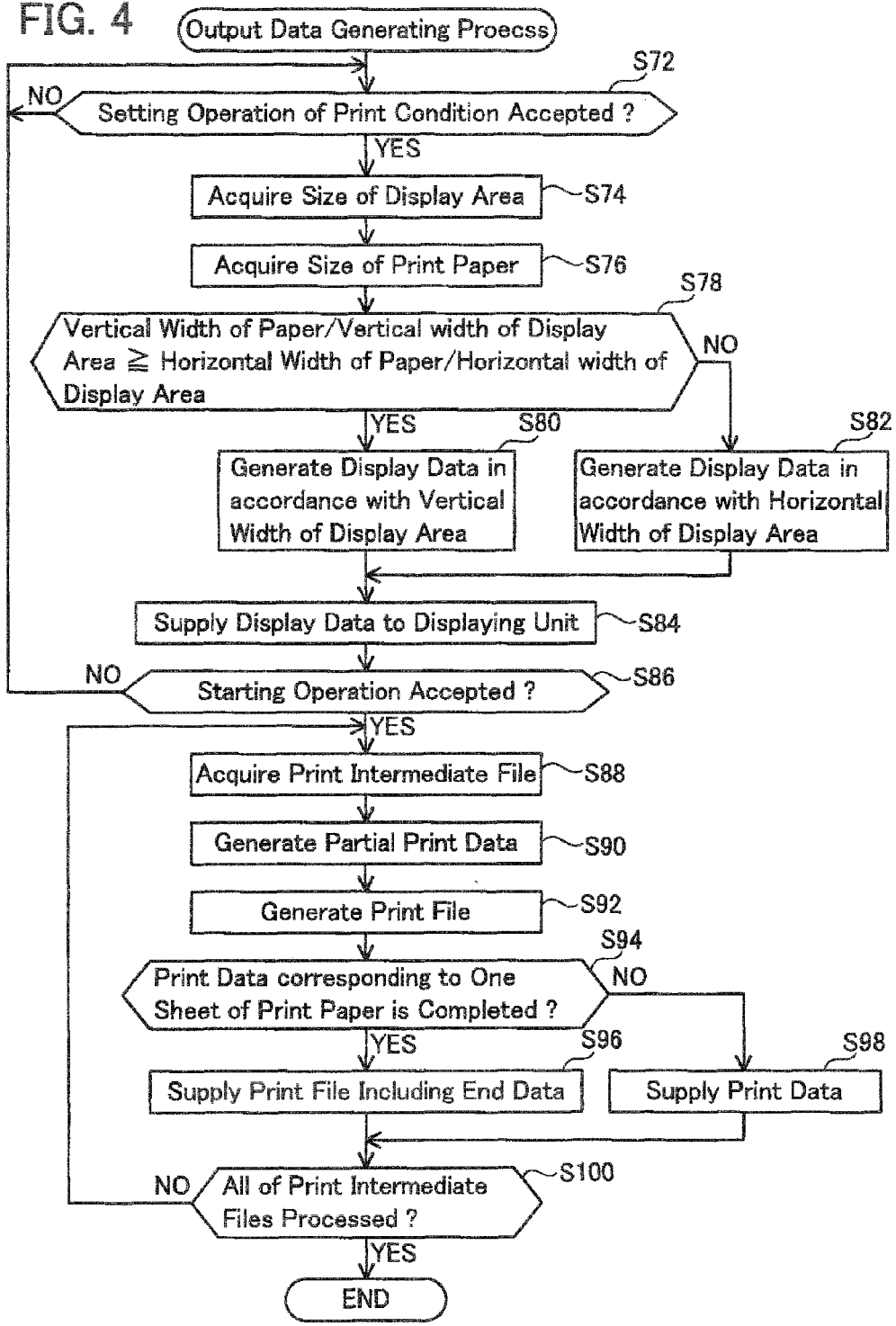
FIG. 4 shows a flowchart of an output data generating process.
Figure 6:
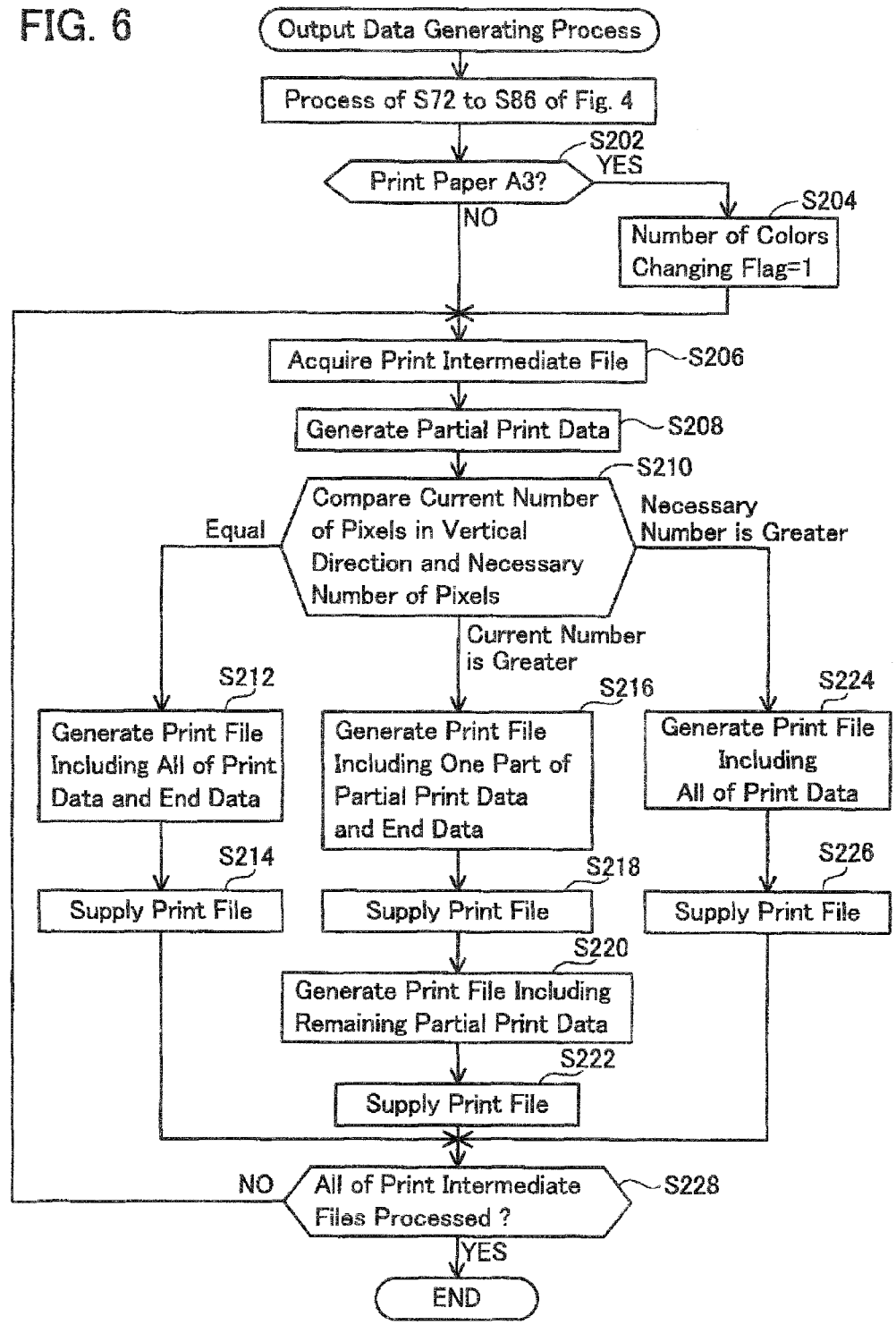
FIG. 6 shows a flowchart of a print data generating process according to a second embodiment.

The output data generating process shown in FIG. 6 performs the processes similar to those of S72 to S86 shown in FIG. 4. In the present embodiment, the print data generating unit 54 determines whether the size of the print sheet that is included in the print conditions set by the user (see S72 in FIG. 4) is A3 or not (S202). In a case where the size of the print sheet is A3 (YES in S202), the print data generating unit 54 sets a color number change flag stored in the memory 30 at "1" (S204) and proceeds to S206. When, on the other hand, the size of the print sheet is other than A3 (i.e., A4 or letter size) (NO in S202), the print data generating unit 54 proceeds to S206 without performing S204.

In S206, similar to S88 shown in FIG. 4, the print data generating unit 54 acquires a print intermediate file (compressed in PNG format) and expands the print intermediate file, thereby generating one print partial intermediate data in the work area of the temporary storage area 34. The print data generating unit 54 subsequently generates the partial print data using the print partial intermediate data within the work area (S208).

Note that in a case where the color number change flag is "1," the print data generating unit 54 generates the partial print data such that the number of colors represented by the partial print data is lower than the number of colors represented by the print partial intermediate data. For instance, when the print partial intermediate data is a data represented by 24-bit RGB (R=8 bits, G=8 bits, B=8 bits), the print data generating unit 54 converts the data into a data represented by 16-bit RGB (R=5 bits, G=6 bits, B=5 bits). The process other than this process is same as that of S90 shown in FIG. 4.

Here, because the larger the size of the print sheet, the greater the size of the print data, in a case where the size of the print sheet is large (i.e., A3) the number of colors expressed by the print data decreases in this configuration. As a result, the size of the print data can be reduced. This can prevent the situation where the print data is no longer generated as a result of the deficiency in the free space of the work area due to the large print data size.

Moreover, in S208, the print data generating unit 54 updates the current number of pixels in the vertical direction that is stored in the memory 30, by adding the number of pixels in the vertical direction of the partial print data to the current number of pixels in the vertical direction. The print data generating unit 54 compares the current number of pixels in the vertical direction with the required number of pixels (S210). In a case where it is determined in S210 that the current number of pixels in the vertical direction is equal to the required number of pixels, the print data generating unit 54 generates a print file that includes all of the partial print data generated in S208 and the end data (S212). Next, the supplying unit 58 supplies the print file generated in S212, to the printer 300 (S214) and proceeds to S228. Note that, once S214 is ended, the print data generating unit 54 updates the current number of pixels in the vertical direction to "0."

A case where it is determined in S210 that the current number of pixels in the vertical direction is larger than the required number of pixels means a case where the image that is represented by the partial print data generated in S208 is printed over two print sheets. In this case, the print data generating unit 54 subtracts the required number of pixels from the current number of pixels in the vertical direction, to calculate the specific number of pixels in the vertical direction. Next, out of the partial print data generated in S208, the print data generating unit 54 generates a print file that includes the end data and data that represent an image above an image between a lower end of the image represented by the partial print data and the specific number of pixels in the vertical direction (S216). Subsequently, the supplying unit 58 supplies the print file generated in S216, to the printer 300 (S218).

Next, the print data generating unit 54 generates a print file that does not include the end data but the remaining partial print data of the partial print data generated in S208 (S220). Next, the supplying unit 58 supplies the print file generated in S220, to the printer 300 (S222) and proceeds to S228. Note that, once S222 is ended, the print data generating unit 54 updates the value, which is obtained by subtracting the required number of pixels from the current number of pixels in the vertical direction, to the current number of pixels in the vertical direction.

When it is determined in S210 that the required number of pixels is larger than the current number of pixels in the vertical direction, the print data generating unit 54 generates a print file that does not include the end data but all of the print data generated in S208 (S224). Next, the supplying unit 58 supplies the print file generated in S224, to the printer 300 (S226) and proceeds to S228.

As with S100 shown in FIG. 4, in S228 it is determined whether all of the plurality of print intermediate files within the memory card 19 is processed or not. In a case where the result of S228 is NO, the print data generating unit 54 returns to S206. In a case where, on the other hand, the result of S228 is YES, the print data generating process is ended. In so doing, the print data generating unit 54 may supply data indicating the end of printing, to the printer 300.

The above has described the second embodiment in detail. In a case where an image represented by the partial intermediate data needs to be printed over two print sheets, the controlling device 20 can generate each of the partial print data utilized in printing performed on these two print sheets.

Note that the partial print data included in the print file that is obtained in S216 of FIG. 6 is an example of the "first partial print data," and the partial print data included in the print file obtained in S220 is an example of the "second partial print data." The A4 size and the letter size are examples of "first size," and the A3 size is an example of the "second size." The 24-bit RGB is an example of the "first number of colors," and the 16-bit RGB is an example of the "second number of colors."

(Modifications)

(1) The print intermediate data may be not only in PNG format but also in PDF (Portable Document Format) format, PS (Post Script) format, binary format, JPEG format, uncompressed bitmap format, and vector format. In general, the print intermediate data can be a type of data that can represent an image using data included in one file. In other words, the print intermediate data is different than a type of data that cannot display a predetermined image without utilizing the data included in a plurality of files, such as the web data. The same is true for the print partial intermediate data, the display intermediate data and the display partial intermediate data.

(2) In the second embodiment, the controlling device 20 converts the print intermediate data expressed by the 24-bit RGB into the print data expressed by the 16-bit RGB in a case where a large size of the print sheet (A3) is input by the user. Instead, the controlling device 20 may convert the print intermediate data into the print data expressed in black and white. In this modification, the black-and-white color is an example of the "second number of colors."

Alternatively, in a case where the size of the print sheet that is input by the user is a postcard size, the controlling device 20 may convert the print intermediate data into the print data expressed by the 24-bit RGB. In a case where the size of the print sheet is the A4 size, the controlling device 20 may convert the print intermediate data into the print data expressed by the 16-bit RGB. In a case where the size of the print sheet is the A3 size, the controlling device 20 may convert the print intermediate data into the print data expressed in black and white. In this modification, when the A4 size is an example of the "first size," the A3 size is an example of the "second size," the 16-bit RGB is an example of the "first number of colors," and the black-and-white color is an example of the "second number of colors." When the postcard size is an example of the "first size," the A4 size is an example of the "second size," the 24-bit RGB is an example of the "first number of colors," and the 16-bit RGB is an example of the "second number of colors."

(3) In each of the embodiments described above, when the activation operation for activating the print application 32*a* is accepted (YES in S18 in FIG. 2), the controlling device 20 deletes the intermediate data stored in the memory card 19 (see S22 in FIG. 2). Instead, once an operation for ending the application 32*a* performed by the user is accepted, the controlling device 20 may delete the intermediate data. Alternatively, when a predetermined amount of time elapses after the intermediate data is stored in the memory card 19, or when the free space within the memory card 19 becomes equal to or lower than a predetermined capacity, the controlling device 20 may delete the intermediate data.

(4) The "controlling device" may be a controlling device other than the controlling device 20 of the cellular phone device 10, such as a PC, a printer, or a PDA. The "print performing unit" and "controlling device" may be mounted in the same device. The "memory" may be an external memory other than the memory card 19, such as a hard disc or a USB memory, or may be an internal memory mounted in the cellular phone device 10.

(5) In each of the embodiments described above, the units 50 to 58 are realized when the CPU 22 performs the processes according to the print application 32*a*; however, at least one of the units 50 to 58 may be realized by hardware such as a logic circuit.

(6) In a case where printing needs to be performed on a print sheet of at least one size (e.g., the size that is set by default in the print application 32a) out of the print sheets on which the printer 300 can perform printing, the controlling device 20 may generate the print partial intermediate data such that any of the images represented by the plurality of print partial intermediate data is not printed over at least the first print sheet and the subsequent print sheet. This can reduce the time for generating the print data used on the first print sheet.

(7) In the embodiments described above, the controlling device 20 generates the display intermediate data using the print intermediate data 500. However, the controlling device 20 may generate the display intermediate data using the web data 400.

(8) In the embodiments described above, each time when the partial print data is generated from the print partial intermediate data, the controlling device 20 supplies a print file that includes the partial print data, to the printer 300. However, the controlling device 20 may supply the print file that includes the partial print data, to the printer 300, each time when the print data corresponding to one print sheet are generated from the plurality of print partial intermediate data. In addition, the printer 300 may temporarily save the print file that includes the partial print data and is sent from the controlling device 20, in the memory of the printer 300 each time when the print file is received. In this case, the printer 300 may start printing using the print data saved in the memory, in response to the fact that the end data or other data indicating the end of printing is received from the controlling device 20.

Moreover, the technical elements described in the specification and the drawings display technical utility either independently or in various combinations, and are not limited to the combinations stated in the claims in the present application. Furthermore, the technology described as examples in the present specification or drawings achieves a plurality of objects simultaneously, and has technical utility by achieving any one of these objects.

The invention claimed is:

1. A controlling device for causing a print performing unit to print an original image represented by original data, the controlling device comprising:
   a work memory with a particular capacity;
   a processor configured to:
      receive a print instruction for printing;
      determine a dimension of a print sheet and a first aspect ratio of the print sheet;
      determine a first number of horizontal pixels in accordance with the dimension of the print sheet;
      determine a second number of vertical pixels in accordance with the first number of horizontal pixels and the particular capacity of the work memory;
      determine a second aspect ratio by dividing the second number of vertical pixels by the first number of horizontal pixels;
      set a data position value at zero (0);
      obtain a current data position value by adding the second aspect ratio to a previous data position value;
      determine whether the current data position value is less than the first aspect ratio;
      when the current data position value is less than the first aspect ratio:
         generate a first type of intermediate data using the original data in response to receipt of the print instruction, the first type of intermediate data comprising a first partial intermediate data, wherein the first partial intermediate data represents first partial image of the original image, the first partial image having the first number of horizontal pixels and the second number of vertical pixels in the second aspect ratio;
         generate a first intermediate file comprising the first partial intermediate data;
         store the first intermediate file in the work memory; and
         transfer the first intermediate file to another memory from the work memory and delete the first intermediate file in the work memory;
      when the current value of data position is not less than the first aspect ratio;
         generate a second partial intermediate data, wherein the second partial intermediate data represents second partial image of the original image, the second partial image having the first number of horizontal pixels and a third number of vertical pixels, wherein the third number of vertical pixels is determined in accordance with a third aspect ratio which is a difference between the first aspect ratio and the previous value of data position;
         generate a second intermediate file comprising the second partial intermediate data;
         store the second intermediate file in the work memory; and
         transfer the second intermediate file to the another memory from the work memory and delete the second intermediate file in work memory;
      receive a setting instruction from a user for setting a print condition after storing the generated plurality of partial intermediate files in the another memory;
      determine the print condition in accordance with the received setting instruction;
      generate print data on the print sheet using the first and second intermediate files stored in the another memory in accordance with the determined print condition; and
   supply the generated print data to the print performing unit.

2. The controlling device as in claim 1, wherein
the processor is configured to generate a second type of intermediate data using the first type of intermediate data before accepting the setting instruction,
store the second type of intermediate data stored in the another memory,
generate display data representing a print preview image using the second type of intermediate data stored in the another memory in accordance with the print condition after the setting instruction has been accepted;
supply the display data to a displaying unit, and
generate the print data using the first and second intermediate files stored in the another memory in accordance with the determined print condition when a start instruction for starting printing is accepted after the display data has been supplied to the displaying unit.

3. The controlling device as in claim 2, wherein
the processor is configured to generate the second type of intermediate data such that a size of an image represented by the second type of intermediate data is different from a size of an image represented by the first type of intermediate data.

4. The controlling device as in claim 1, wherein
the processor is configured to generate the first type of intermediate data in accordance with a predetermined print condition which the print performing unit is capable of performing, the predetermined print condition being a print condition in which a data size of the first type of the intermediate data is the largest.

5. The controlling device as in claim 1, wherein after the print data has been supplied to the print performing unit, the processor is configured to keep a state in which the first and second intermediate files are stored in the another memory.

6. The controlling device as in claim 1, wherein the processor is configured to delete the first and second intermediate files from the another memory when a new print instruction is accepted after the first and second intermediate files have been stored in the another memory.

7. The controlling device as in claim 1, wherein the processor is configured to generate the print data represented by a first number of colors in a case where the print condition indicates printing on a print medium having a first size, and
generate the print data represented by a second number of colors that is smaller than the first number of colors in a case where the print instruction indicates printing on a print medium having a second size that is larger than the first size.

8. A computer readable recording device including a computer program for a controlling device for causing a print performing unit to print an original image represented by original data,
the computer program including instructions for ordering a computer mounted on the controlling device to perform:
receiving a print instruction for printing;
determining a dimension of a print sheet and a first aspect ratio of the print sheet;
determining a first number of horizontal pixels in accordance with the dimension of the print sheet;
determining a second number of vertical pixels in accordance with the first number of horizontal pixels and the particular capacity of the work memory;
determining a second aspect ratio by dividing the second number of vertical pixels by the first number of horizontal pixels;
setting a data position value at zero (0);
obtaining a current data position value by adding the second aspect ratio to a previous data position value;
determining whether the current data position value is less than the first aspect ratio;
when the current data position value is less than the first aspect ratio:
generating a first type of intermediate data using the original data in response to receipt of the print instruction, the first type of intermediate data comprising a first partial intermediate data, wherein the first partial intermediate data represents first partial image of the original image, the first partial image having the first number of horizontal pixels and the second number of vertical pixels in the second aspect ratio;
generating a first intermediate file comprising the first partial intermediate data;
storing the first intermediate file in the work memory; and
transferring the first intermediate file to another memory from the work memory and delete the first intermediate file in the work memory;
when the current value of data position is not less than the first aspect ratio;
generating a second partial intermediate data, wherein the second partial intermediate data represents second partial image of the original image, the second partial image having the first number of horizontal pixels and a third number of vertical pixels, wherein the third number of vertical pixels is determined in accordance with a third aspect ratio which is a difference between the first aspect ration and the previous value of data position;
generating a second intermediate file comprising the second partial intermediate data;
storing the second intermediate file in the work memory; and
transferring the second intermediate file to the another memory from the work memory and delete the second intermediate file in work memory;
receiving a setting instruction from a user for setting a print condition after storing the generated plurality of partial intermediate files in the another memory;
determining the print condition in accordance with the received setting instruction;
generating print data on the print sheet using the first and second intermediate files stored in the another memory in accordance with the determined print condition; and
supplying the generated print data to the print performing unit.

9. A controlling device comprising:
a processor;
a work memory with a particular capacity; and
a memory for storing instructions to be performed by the processor, wherein the instructions, when performed by the processor, cause the processor to function as:
receive a print instruction for printing;
determine a dimension of a print sheet and a first aspect ratio of the print sheet;
determine a first number of horizontal pixels in accordance with the dimension of the print sheet;
determine a second number of vertical pixels in accordance with the first number of horizontal pixels and the particular capacity of the work memory;
determine a second aspect ratio by dividing the second number of vertical pixels by the first number of horizontal pixels;
set a data position value at zero (0);
obtain a current data position value by adding the second aspect ratio to a previous data position value;
determine whether the current data position value is less than the first aspect ratio;
when the current data position value is less than the first aspect ratio:
an intermediate data generating unit configured to generate a first type of intermediate data using the original data in response to receipt of the print instruction, the first type of intermediate data comprising a first partial intermediate data, wherein the first partial intermediate data represents first partial image of the original image, the first partial image having the first number of horizontal pixels and the second number of vertical pixels in the second aspect ratio;
generate a first intermediate file comprising the first partial intermediate data;
a storage controlling unit configured to store the first intermediate file in the work memory; and
transfer the first intermediate file to another memory from the work memory and delete the first intermediate file in the work memory;
when the current value of data position is not less than the first aspect ratio;
generate a second partial intermediate data, wherein the second partial intermediate data represents second partial image of the original image, the second partial image having the first number of horizontal pixels and a third number of vertical pixels, wherein the third number of vertical pixels is determined in accordance with a third aspect ratio which is a difference between the first aspect ration and the previous value of data position;

generate a second intermediate file comprising the second partial intermediate data;

store the second intermediate file in the work memory; and transfer the second intermediate file to the another memory from the work memory and delete the second intermediate file in work memory;

receive a setting instruction from a user for setting a print condition after storing the generated plurality of partial intermediate files in the another memory;

determine the print condition in accordance with the received setting instruction;

a print data generating unit configured to generate print data on the print sheet using the first and second intermediate files stored in the another memory in accordance with the determined print condition; and a supplying unit configured to supply the generated print data to the print performing unit.

* * * * *